Aug. 25, 1936.   J. F. HYDE   2,052,229
JOINING OR CEMENTING GLASS BUILDING UNITS
Filed May 21, 1934   2 Sheets-Sheet 1

INVENTOR.
JAMES FRANKLIN HYDE
BY
ATTORNEYS.

Aug. 25, 1936.   J. F. HYDE   2,052,229
JOINING OR CEMENTING GLASS BUILDING UNITS
Filed May 21, 1934   2 Sheets-Sheet 2

INVENTOR.
JAMES FRANKLIN HYDE.
BY *Dorsey & Cole*
ATTORNEYS.

Patented Aug. 25, 1936

2,052,229

UNITED STATES PATENT OFFICE 2,052,229

JOINING OR CEMENTING GLASS BUILDING UNITS

James Franklin Hyde, Corning, N. Y., assignor to Corning Glass Works, Corning, N. Y., a corporation of New York Application May 21, 1934, Serial No. 726,871

6 Claims. (Cl. 72—37)

This invention relates to the art of joining or cementing together glass articles and has for its object to form substantially invisible weathertight flexible joints between glass articles such as glass building units or blocks.

Glass building units, such as bricks, blocks, tiles, etc., although known for some time, are just beginning to come into common use in buildings which have a part or all of their outer walls composed of glass, and it is predicted that they will find extensive application in the future. Heretofore such units have been joined with ordinary mortar and cement, and despite the unsightly appearance of such joints no successful method, insofar as I know, has been devised for uniting the units with transparent weatherproof joints. Since the outstanding characteristic of glass which renders it desirable for use as a building material is its transparency for light, it would further be desirable to join such units by invisible means, that is, with a transparent joint having substantially the same refractive index as the glass in order that structures composed of glass units may appear as monolithic structures.

I have found that I can unite glass units, such as bricks, blocks, tiles, etc., with a substantially invisible joint, which is impermeable to water and which is sufficiently flexible to withstand the expansions and contractions due to temperature variations incident to changing weather conditions, and I am able to do this without the use of heat or high pressure during the construction.

Among its features my invention comprises applying to the edges of the units synthetic resin, applying to the coated edges a solution of polymerized resin dissolved in a polymerizable monomer, and bringing the coated edges of the units into abutting relation.

My invention further comprises a plurality of glass units, such as bricks, blocks, tiles, etc., joined together with a layer of synthetic resin which has substantially the same refractive index as the glass.

My invention further resides in the novel construction, arrangement and combination of parts to be more fully described herein, claimed in the appended claims and illustrated in the accompanying drawings in which:

Figure 1:
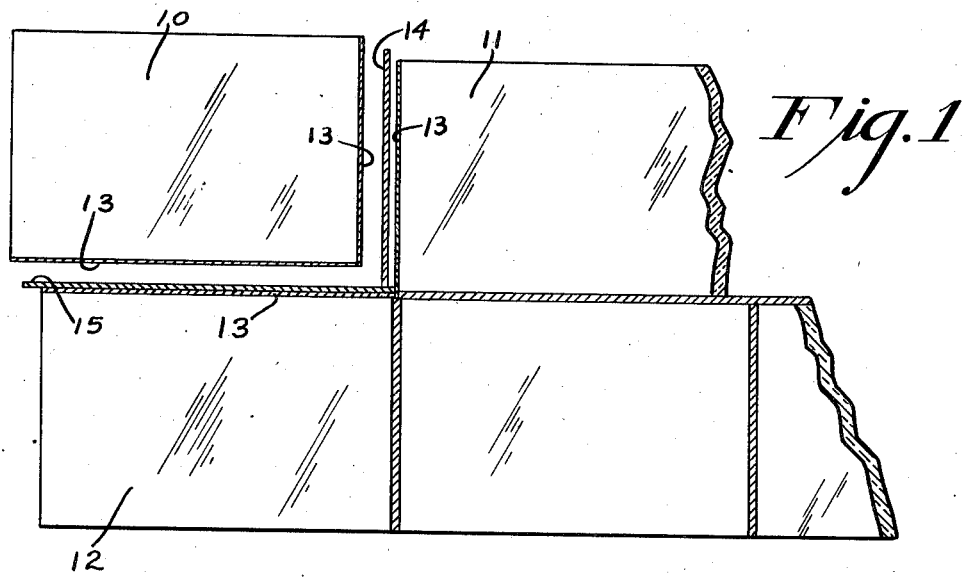
Fig. 1 is an elevation of a portion of a wall of glass building units showing my method of uniting such units.

In Fig. 1 glass building units 10, 11, and 12 have their adjacent edges provided with coatings 13 of a solution of a synthetic resin, such as vinyl acetate. Strips 14 and 15 of a very viscous solution of the resin are disposed between the adjacent coatings 13 of the units 10, 11, and 12.

Figure 2:
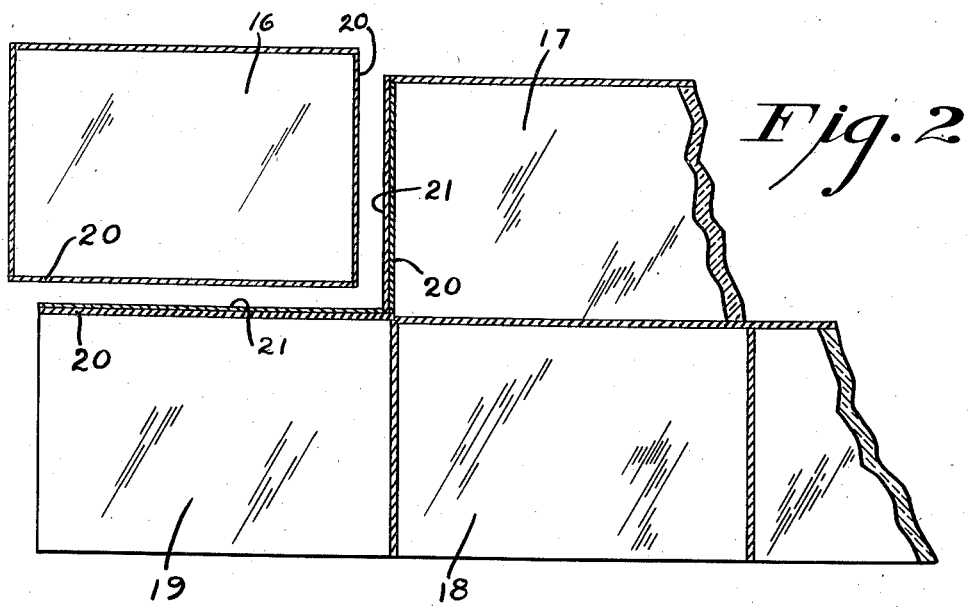
Fig. 2 is an elevation of a portion of a wall of glass building units showing a modified method of uniting such units.

In Fig. 2, glass building units 16, 17, 18, and 19 have their edges provided with facings 20 of polymerized synthetic resin, such as vinyl acetate. On the facings 20 of the units 17 and 19 is a coating 21 of a solution of synthetic resin.

Figure 3:
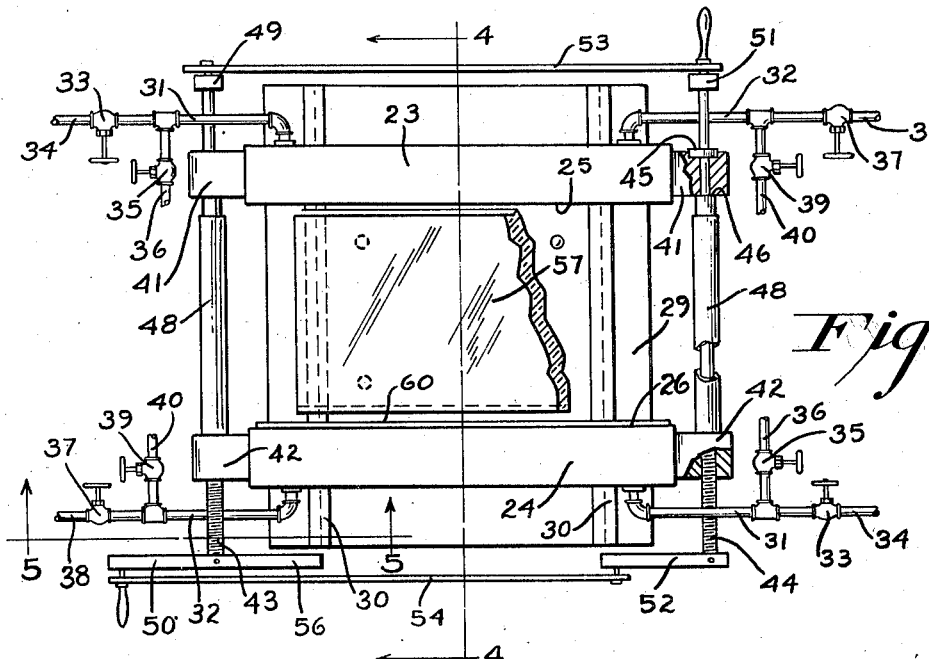
Fig. 3 is a plan view of an apparatus for applying facings of synthetic resin to the opposite edges of glass blocks or building units.
Figure 4:
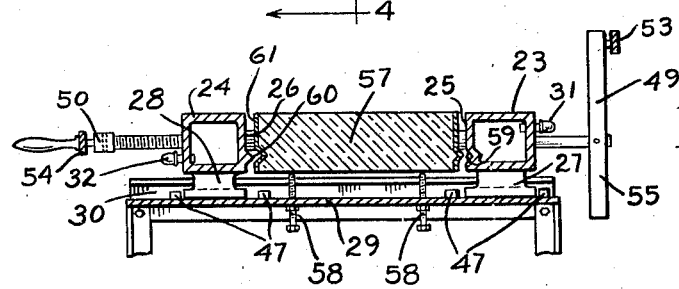
Fig. 4 is a vertical sectional view on the line 4—4 of Fig. 3.
Figure 5:
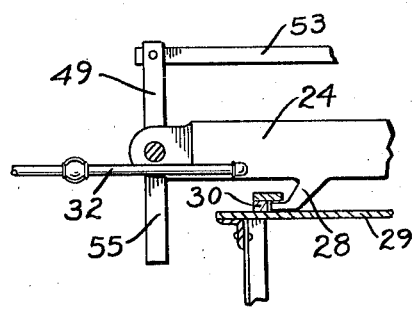
Fig. 5 is a fragmentary vertical sectional view on the line 5—5 of Fig. 3.

In Figs. 3, 4, and 5 a pair of platens 23 and 24, having polished inner faces 25 and 26, are supported by feet 27 and 28 which rest upon a table 29 and are slidably engaged by a pair of tracks 30 which are bolted to the table. The platens 23 and 24 are hollow and each is provided with an upper tubular conduit 31 and a lower tubular conduit 32, attached to the outer face of the opposite ends of the respective platen and communicating with its hollow interior. The conduits 31 are each provided with a valve 33 which communicates with a steam line 34, and a valve 35, which communicates with a waste line 36. The conduits 32 are each provided with a valve 37, which communicates with a water line 38, and a valve 39, which communicates with a waste line 40. The platens 23 and 24 are provided at their ends with bosses 41 and 42 respectively, which serve as bearings for shafts 43 and 44 which pass therethrough. Collars 45, only one of which is shown, are pinned on one end of each of the shafts 43 and 44 and serve as stops against the recessed outer face of the bosses 41. The remaining portions of the shafts 43 and 44 are of a larger diameter than the portions which are within the bosses 41 and form shoulders as at 46, which bear against the inner faces of the bosses 41. The shafts 43 and 44 are threaded where they pass through the bosses 42, and the bosses 42 are internally threaded to correspond therewith. The shafts 43 and 44 therefore are fixed longitudinally with respect to the platen 23 but, when rotated, are movable longitudinally with respect to the platen 24. Stops 47 are fixed to the top of the table 29 and limit the to and fro movement of the feet 27 and 28 along the tracks 30. Cylindrical sleeves 48 surround the shafts 43 and 44 and limit the movement of the platens 23 and 24 toward each other. The length of the sleeves 48 is such that, when the bosses 41 and 42 are brought against the opposite ends thereof, the feet 27 and 28 are just short of their inner limiting stops 47.

In order to move the platens 23 and 24 uniformly and with spaced relation to each other, the shafts 43 and 44 are provided with a system of cranks and connecting bars comprising cranks 49 and 50, pinned to the outer ends of the shaft 43 at an angle of 90° relative each to the other, cranks 51 and 52 pinned to the outer ends of the shaft 44 at an angle of 90° relative each to the other and two connecting bars 53 and 54, the first of which links the crank 49 to the crank 51 and the second of which links the crank 50 to the crank 52, so that all four cranks must rotate in unison. The cranks 49 and 50 are extended for a short distance beyond their centers to form counterweights 55 and 56.

For the purpose of supporting a glass building block 57 in proper relation to the platens 23 and 24, the table 29 is provided with a plurality of adjustable screws 58, two of which are shown in Fig. 2. The polished inner faces 25 and 26 of the platens may be provided with any suitable configuration, such as a groove 59 and a tongue 60, to fit a corresponding tongue and groove in the glass block 57. Sheets 61 of synthetic resin are attached to the edges of the glass block 57 by the process to be hereinafter described.

In practicing my invention, I prepare solutions of a suitable synthetic resin, such as polymerized vinyl acetate, commonly known as vinylite, preferably in the following manner, it being understood that the proportions may be varied: A 30% solution is made by adding 30 parts by weight of the polymer to 70 parts by weight of the monomer, in which it dissolves readily by stirring for about fifteen minutes. The solution may be hastened by warming the mixture. In like manner a 40% solution is prepared by mixing 40 parts by weight of the polymer with 60 parts by weight of the monomer. These solutions have a relatively high viscosity, the 30% solution being of about the consistency of ordinary paint and the 40% solution being of about the consistency of molasses. A 75% solution is made by mixing 75 parts by weight of the polymer with 25 parts by weight of the monomer.

In preparing the 75% solution, care must be exercised to produce a homogeneous solution free from lumps of undissolved material, and this is difficult to accomplish by ordinary means. After many failures to do this, the following method therefor was evolved:

The pulverized polymeric resin is uniformly mixed with the proper amount of the monomer by pouring one into the other while the mixture is being stirred vigorously. The particles of the resin should be wet with the monomer as uniformly as possible. The mixture is then sealed into a container, preferably a metal container such as a tin can and the can and its contents are placed in a steam bath for about 10 hours. At the end of this time a uniformly homogeneous viscous solution of rubber-like consistency will be obtained.

Referring to Fig. 1, the glass units 10, 11, and 12 which, in the present instance, are solid glass blocks of about 18 inches by 28 inches, having a maximum thickness of about 3¾ inches, but which may be hollow and of any convenient size and shape, are coated on their adjacent edges with the 30% solution of resin to form the coatings 13. The solution may be applied with a brush or by spraying. Over the coatings 13 is preferably applied a thin coating of a suitable catalyst which will cause polymerization of the monomer, although this may be omitted if desired. There are many such catalysts, but I prefer to use benzoyl peroxide, dissolved in acetone to form a saturated solution. This solution is applied in a thin layer with a brush or by spraying and the acetone evaporates quickly to leave a thin powdery coating of the catalyst, which amounts to about 2-3% of the amount of monomer to be acted on. This constitutes a very large excess of catalyst over that which is necessary to promote polymerization under ordinary laboratory conditions because, insofar as I know, the maximum amount of catalyst used heretofore has been about .3% and if an excess of catalyst, such as I use, were introduced into such a resin solution under laboratory conditions and heated, the reaction would proceed with explosive violence. However, by not applying heat in my process, I am able to use an excess with safety and to great advantage, as will be seen.

A quantity of the 75% solution of resin is then formed into a flat ribbon about ⅜" in thickness and substantially one half as wide as the glass blocks are thick. This is most easily done by extruding the viscous rubber-like solution from a nozzle of the proper size and shape by means of a pressure gun of the type used for the lubrication of an automobile chassis. A portion of the ribbon thus formed is placed between the vertical adjacent coated edges of the units 10 and 11 and the horizontal adjacent coated edges of the units 10 and 12 to form the strips 14 and 15. The strip 14 is preferably placed in contact with the coating 13 on the vertical edge of the unit 11 and is pressed on slightly with the hands to make it adhere thereto. The strip 15 is preferably laid on top of the coating 13 on the upper horizontal edge of the unit 12. The unit 10 is then moved into position on the unit 12 abutting the unit 11, so that the coated lower horizontal edge of the unit 10 is in close contact with the strip 15. Sufficient horizontal and vertical pressure is applied with the hands or by means of a lever to the unit 10 to cause the strips 14 and 15 to spread and completely fill the joints between the unit 10 and the units 11 and 12. The weight of the unit 10 will usually suffice to furnish the desired vertical pressure. Any excess of the resin solution which may be squeezed out of the joints is preferably trimmed off to present a smooth uniform surface. Other units may subsequently be placed in abutting relation to the units 10, 11, and 12, and joined thereto by means of the resin solutions, as described, to form a complete wall of glass. Since the resin adheres strongly to the glass and fills in pits and uneven surfaces between the units, such joints are weathertight.

Although I may use building units composed of ordinary glass, I prefer to use a heat resisting glass such as the glass B₁ of the Sullivan and Taylor Patent No. 1,304,623, because such glass is resistant to weathering and is better able to withstand the mechanical and thermal stresses which may be imposed by handling during the construction and by changing weather conditions when the structure is completed. Furthermore, the refractive index of the above mentioned glass $B_1$ is substantially the same as that of polymerized vinyl acetate, and structures formed by joining these glass building units by my method appear as monolithic structures when completed, because the joints thereof are substantially invisible.

By applying an excess of catalyst to the coatings 13 on both sides of the strips 14 and 15, I cause a slow polymerization of the monomer in which the resin is dissolved. This polymerization proceeds with sufficient slowness to permit completion of the structure while the joints are relatively soft and adaptable to structural stresses, but it ultimately results in a very tough and uniform joint of polymerized resin which adheres permanently to the glass. Even when completely polymerized, the resin is sufficiently elastic to compensate for any slight movement of the units as might be caused by vibration or by expansion or contraction thereof.

Figure 6:
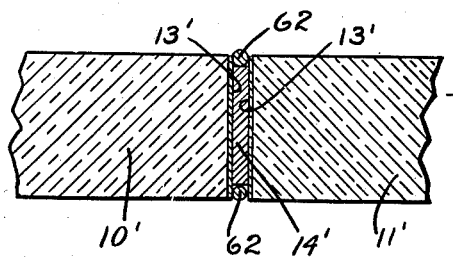
Fig. 6 is a horizontal sectional view through a wall similar to that shown in Fig. 1, showing a modified form of joint.

Under some circumstances it is desirable to complete the joint in a slightly different manner, as shown in Fig. 6. In forming such a joint the strip 14' of viscous 75% resin solution, corresponding to strips 14 and 15 of Fig. 1, is made somewhat narrower than the thickness of the units 10' and 11' so that, when the units are in final position between the coated edges 13', as shown, the strip 14' will fall somewhat short of filling the joint flush to the edges of the units. A solid rod 62, of suitable size, of the polymerized resin is then softened by heat and before it has lost its plasticity it is pressed into the joint to contact and unite with the strip 14' and fill the joint flush with the edges of the units 10' and 11'. The rod 62 is preferably pressed into place and molded with the hands, though suitable mechanical means of application may be used. After being put into position the rod 62 unites with the strip 14' and upon becoming cool it hardens and forms a tough relatively rigid seal which nullifies any tendency of the strip 14' to flow out of the joint before it has become polymerized and set. I find that such a joint is particularly desirable in very hot weather, under which conditions the viscous strip 14' is prone to flow more readily than when temperature is lower.

In case a very accurate alignment of the joints is required, as is sometimes necessary in conforming closely to the given dimensions of a structure, I have found it advantageous to form facings 20 (Fig. 2) of polymerized resin on the upper and lower faces of the glass units so that the overall vertical dimension of all the units is the same. For accurate work, the application of such facings to opposite faces of the units is essential, because, despite the care with which the glass units are fabricated, opposite faces will not be structurally plane and parallel on account of bulging, chill marks, and other imperfections in the surface of the glass. These facings are best applied by means of heat and pressure before the units are joined together, as will be described.

In such a case the glass units are joined together in the manner illustrated in Fig. 2. The facings 20, having been applied to the units, a 40% solution of the resin is applied preferably to the upper horizontal facing of the unit 19 and to the vertical facing of the unit 17 to form the coatings 21, after which the unit 16 is placed so as to bring the coatings 21 of the units 17 and 19 into contact with the facings 20 of the unit 16, in which position the facings 20 of the three units are sealed together by the 40% solution, the horizontal and vertical faces being united at the same time.

Other units, having similar facings 20 and having the same overall dimensions, may subsequently be placed in abutting relation to the units 16, 17, and 19 and joined thereto as described. The overall dimensions of all of the units being the same, the joints of the structure will necessarily be straight lines and the uniform height and width of the structure can be controlled with great accuracy.

In case extreme accuracy of assembly is required only in the horizontal joints, these joints may be assembled as shown in Fig. 2 by means of facings 20 and coatings 21 and the vertical joints may be assembled as shown in Fig. 1 by means of the coatings 13 and the viscous strip 14. Conversely the horizontal joints may be constructed as shown in Fig. 1 and the vertical joints as shown in Fig. 2.

The facings 20 may be applied by any suitable means, but are preferably applied by the means illustrated in Figs. 3, 4, and 5. The glass unit or block 57 is placed on the screws 58 which are adjusted to level the block with respect to the platens 23 and 24, as shown in Figs. 3 and 4. Flat sheets of resin are inserted between the platens and the block. These sheets, which are shown in Fig. 4 as a part of the completed unit and are designated 61, are in the present instance about $\frac{3}{32}$ of an inch in thickness and are somewhat larger than the faces of the glass block to which they are opposed. The cranks 49, 50, 51, and 52 are rotated to revolve the shafts 43 and 44 and move the platens 23 and 24 along the tracks 30 into abutting relation with the glass block 57, the sheets of the resin being squeezed slightly between the glass block and the faces 25 and 26 of the platens. The valves 33 are then opened to admit steam to the interior of the hollow platens and the valves 39 are opened to carry off any water which is formed by condensation and to insure a continuous flow of steam through the platens. The platens are thus heated and the sheets of resin are softened under the influence thereof. As the resin becomes soft, the cranks are again rotated to move the platens and compress the softened resin against the sides of the glass block 57, thereby filling out the inaccuracies in the sides of the block and forcing the resin accurately to conform to the configuration of the faces 25 and 26 of the platens. The advancing movement of the platens is continued until the bosses 41 and 42 are tightly pressed against the ends of the sleeves 48 and the excess resin is squeezed out along the edge of the block, both above and below it. The length of the sleeves 48 is such that the distance between the platens, when the sleeves are in contact with the bosses 41 and 42, is exactly equal to the desired finished dimension of the glass block.

After the sheets of resin have thus been disposed against the sides of the glass block 57, the valves 33 and 39 are closed and the valves 35 and 37 are opened to admit a flow of cold water from the lines 38 to the interiors of the platens 23 and 24, the water being allowed to escape through the waste lines 36. The platens are thus cooled and the resin is chilled and hardened after which the platens are moved away from the sides of the glass block 57 by revolving the cranks 49, 50, 51, and 52 in the reverse direction, the outermost limiting stops 47 acting to cause both platens to draw away from the resin coated sides of the glass block 57 and to prevent either one of the platens sticking thereto. As a further insurance against the platens sticking to the resin, it is advantageous to insert between each sheet of resin and its respective platen a thin sheet of cellophane which will not stick to the platens under the conditions of the treatment and can readily be removed from the resinous faces after completion of the treatment. After the platens have been removed from the resin faced sides of the glass block 57, the projecting edges of the resin are trimmed off flush to the block with a sharp knife. The resin adheres strongly to the glass and becomes an integral part thereof. If it is desired to treat all four edges of the glass block, this may be done by treating two opposite edges as described and by then turning the block through 90 degrees and treating the other two edges.

While in the foregoing there has been shown and described the preferred embodiment of my invention, it is to be understood that minor changes in the details of construction, combination and arrangement of parts may be resorted to without departing from the spirit and scope of my invention as claimed.

I claim:

1. The method of forming a transparent and substantially invisible joint between glass construction units, which includes coating adjacent edges of the units with homogeneous viscous solutions of a polymerized synthetic resin having substantially the same refractive index as the glass, dissolved in a polymerizable monomer, coating the resin with a polymerizing catalyst, moving the coated edges of the units into abutting relation and placing heat softened rods of a polymerized synthetic resin between the outer edges of the units to seal the joints.

2. The method of joining glass construction units, which includes applying to edges of the units homogeneous viscous solutions of polymerized vinyl acetate dissolved in monomeric vinyl acetate and thin coatings comprising about 2–3% of benzoyl peroxide, moving the coated edges of the units into abutting relation, and placing heat-softened rods of polymerized vinyl acetate between the outer edges of the units to seal the joints.

3. The method of joining glass construction units, which includes applying substantially parallel facings of a polymerized synthetic resin to opposite horizontal edges of each unit, the outer surfaces of the facings being a predetermined distance apart, inserting between adjacent facings a viscous solution of the polymerized resin dissolved in the monomer, coating adjacent vertical edges of the units with homogeneous viscous solutions of a polymerized synthetic resin dissolved in a polymerizable monomer, applying thin coatings of a polymerizing catalyst to the last named coatings, moving the adjacent edges of the units into abutting relation, and placing heat-softened rods of polymerized resin between the outer vertical edges of the units to seal in the viscous solutions.

4. In combination a plurality of glass construction units, on adjacent edges of the units a layer of a viscous 30% solution of synthetic resin comprising 30 parts by weight of a polymerized synthetic resin dissolved in 70 parts by weight of the monomer, between adjacent layers of the 30% resin solution a layer of a viscous 75% solution comprising 75 parts by weight of a polymerized synthetic resin dissolved in 25 parts by weight of the monomer, and a coating of benzoyl peroxide between the 30% layers and the 75% layer.

5. In combination a plurality of glass construction units, on adjacent edges of the units a layer of a viscous solution of polymerized synthetic resin dissolved in a monomeric synthetic resin, between adjacent layers of the viscous solution a layer of polymerized resin dissolved in a monomer to a rubber-like consistency, and a coating of benzoyl peroxide between the viscous layers and the rubber-like layer.

6. In combination a plurality of glass construction units, on horizontal adjacent edges of the units a facing of polymerized synthetic resin intimately united therewith, between the adjacent horizontal facings of resin a layer of solution of polymerized resin dissolved in a monomer, on vertical adjacent edges of the units a layer of a viscous solution of polymerized resin dissolved in a monomer, between the adjacent vertical layers of viscous resin solution a layer of a polymerized resin dissolved in a monomer to a rubber-like consistency, and a coating of benzoyl peroxide between the adjacent vertical viscous layers and the rubber-like layer.

JAMES FRANKLIN HYDE.